United States Patent [19]

Cabahug

[11] Patent Number: 5,613,816
[45] Date of Patent: Mar. 25, 1997

[54] APPARATUS FOR RAPIDLY ENGAGING AND DISENGAGING THREADED COUPLING MEMBERS

[75] Inventor: Eric F. Cabahug, Fairfax, Va.

[73] Assignee: Thread Technology, Inc., Chantilly, Va.

[21] Appl. No.: 489,158

[22] Filed: Jun. 9, 1995

[51] Int. Cl.⁶ .................................................. F16B 37/08
[52] U.S. Cl. ......................... 411/433; 411/267; 411/270
[58] Field of Search .................................. 411/267, 270, 411/432, 433, 437

[56] References Cited

U.S. PATENT DOCUMENTS

| | | | |
|---|---|---|---|
| 5,118,237 | 6/1992 | Wright | 411/267 X |
| 5,378,100 | 1/1995 | Fullerton | 411/433 X |
| 5,427,488 | 6/1995 | Fullerton et al. | 411/433 |

Primary Examiner—Neill R. Wilson
Attorney, Agent, or Firm—Staas & Halsey

[57] ABSTRACT

A coupling device including first and second members, threaded elements mounted within one of the elements to move between open and closed position, adjacent portions of the threaded elements being provided with sloping surfaces and pin assemblies associated with the threaded elements and positioned between the sloping surfaces such that as a manually operable device is operated the threaded elements are moved longitudinally into engagement with the pin assemblies wedging the pin assemblies against the sloping surface expanding the threaded elements. There are also disclosed balls associated with the threaded elements positioned within openings within the coupling device and being moved when the threaded elements assume their open position into locking relationship.

6 Claims, 3 Drawing Sheets

APPARATUS FOR RAPIDLY ENGAGING AND DISENGAGING THREADED COUPLING MEMBERS

BACKGROUND AND SUMMARY OF THE INVENTION

The present invention relates to a coupling device featuring threaded members capable of rapid engagement and disengagement. Threaded coupling devices, such as nuts and bolts, have often proven ineffective in highly specialized applications, including by way of example, where speed is required, or where extended rotating movement is undesirable.

The coupling device of U.S. Pat. No. 5,378,100, issued Jan. 3, 1995, includes a first member provided with external threads and a second member having an opening therein into which the first member is inserted. The second member is provided with pluralities of movably mounted, internally threaded elements for receiving the external threads of the first member. The first member is inserted within the second member by rectilinear sliding movement, after which the first member is rotated into tight engagement with the second member. Release of the first member is accomplished simply by rotating same slightly in the opposite direction, after which simple manual manipulation of the second member withdraws the threaded elements from engagement permitting the first member to be slidably removed along an axial direction from the second member.

The prior coupling device which is the subject of U.S. Pat. No. 5,378,100 is illustrated in FIG. 1. This coupling device includes a first member 10 provided with threads 16 and a second member 12 having a threaded opening therein in which the first member 10 is inserted in locking relationship. The first member 10 is a bolt provided with a head 14 and helical threads 16 on the shaft thereof.

The second member 12 includes a sleeve 18 into which is slidably mounted a cylinder 20. The cylinder 20 is provided with a series of slots 22 through which corresponding keys 24 pass. The keys 24 are attached to the sleeve 18 with fasteners 26.

The cylinder 20 is provided with a frustoconical surface 19 which is a surface of revolution extending at an acute angle to the longitudinal axis of the sleeve 18 and cylinder 20 along which the first member 10 moves. A second frustoconical surface 21 is provided within the cylinder 20 extending at an acute angle to the longitudinal axis of the sleeve 18 and the cylinder 20.

A plurality of movably mounted externally threaded elements 28 are positioned within the lower cavity of the cylinder 20. The movably mounted threaded elements 28 are held in place and urged downwardly within the cavity 30 by the washer 32. The movably mounted threaded elements 28 are provided with internal threads 29 coaxial with the cylinder 20.

The second member 12 is provided with a cap 34 which is mounted for movement relative to the sleeve 18. The cap 34 includes a shoulder 36 provided with threads 38 which engage the threads 39 of the cylinder 20 permitting the cap 34 to be screwed in place within the cylinder 20. A hole 35 is provided in the shoulder 36 for receiving a locking pin 37 which passes through the hole 21 in the cylinder 20. In this manner, proper alignment of the cap 34 and the cylinder 20 with the slots 22 and key elements 24, sleeve 18 and the threaded elements 28 is ensured. A coil spring 40 is positioned within the gap 42 between the outer wall of the cap 34 and the inner wall of the sleeve 18. The spring 40 normally urges the cap 34 and the sleeve 18 in opposite directions.

A second coil spring 44 is positioned within the cavity 46 between the shoulder 48 of the cap 34 and the lip 50 of the washer 32. The second coil spring 44 normally urges the washer 32 downwardly such that the lip 50 engages the upper edges 54 of the movably mounted threaded elements 28.

Each of the threaded elements 28 includes at the top on the inner surface thereof a frustoconical surface 52 terminating at the upper portion in the edge 54 against which the bottom of the lip 50 of the washer 32 abuts. Each of the elements 28 is also provided with a frustoconical surface 55 extending at an acute angle to the axis of the sleeve 18, thus permitting easy sliding movement between the frustoconical surfaces 21 and 55.

Each of the movably mounted internally threaded elements 28 is provided near the bottom with a frustoconical surface 56 which abuts at an acute angle to the axis of the cylinder 20. The frustoconical surfaces 56 of the movably mounted threaded elements 28 are thereby adapted to axially abut and slide on the frustoconical surface 19 of the cylinder 20. Moreover, the frustoconical surface 56 of each of the elements 28 abuts the sloping surface 58 of each of the keys 24.

Each of the keys 24 protrudes through a slot 22 formed in the cylinder 20 and engages the sloping surface 56 of the movably mounted threaded element 28. Each of the threaded elements 28 is provided with a notch 57 defining the downwardly sloping contact surface area 56 which is complementary in configuration with respect to the downwardly sloping contact surface 58 of the key 24. Thus, as the cap 34 is manually moved closer to the sleeve 18, the keys 24 are moved upwardly causing the threaded elements 28 to move outwardly disengaging the threads 29 from the threads 16 of the first member 10.

From the foregoing it will be apparent that when the bolt 10 is moved inwardly along a rectilinear axis, i.e., without rotation, the threads 16 of the first member 10 engage the threads 29 of each of the threaded elements 28, moving same outwardly. After the first member or bolt 10 is pushed all the way into the second member 12, or as close thereto as may be desired or practical, the head 14 is manually rotated until the inside surface 61 of the head 14 abuts the lower surface of the sleeve 18, thus locking the first member 10 within the second member 12. Unlocking is accomplished as the top 34 and the shoulder 35 of the sleeve 18 are moved in close proximity to one another against the force of the first coil spring 40 promoting upward movement of the keys 24 while the sliding movement of the sliding surfaces 58 of the keys 24 and the supporting surfaces 56 of the threaded elements 28 move the threaded elements 28 outwardly away from each other in a radial direction thus releasing the engagement between the threads 16 of the first member and the threads 29 of the threaded elements 28, thus permitting the first member to be removed by rectilinear, sliding movement.

Rapid engagement and disengagement along a rectilinear axis is accomplished with the coupling members of the present invention, wherein there are featured pin assemblies movably fitted within adjacent V-shaped segments of the movably mounted external threaded elements, such that as the coupling members are moved relative to each other the pin assemblies force the threaded elements apart. In addition, ball assemblies are employed enhancing the locking

DESCRIPTION OF THE PREFERRED EMBODIMENT

Figure 1:
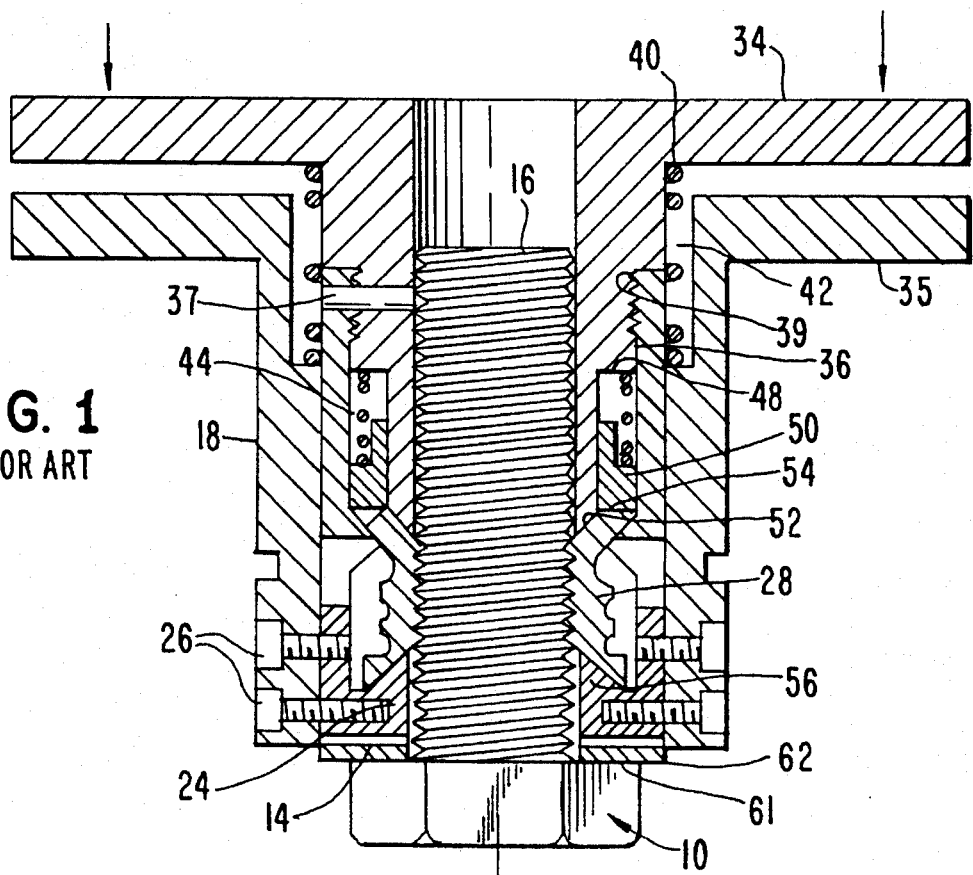
FIG. 1 is a sectional view of an earlier coupling device illustrating the position of the parts of the second coupling member when the first coupling member is fully threaded therein.
Figure 2:
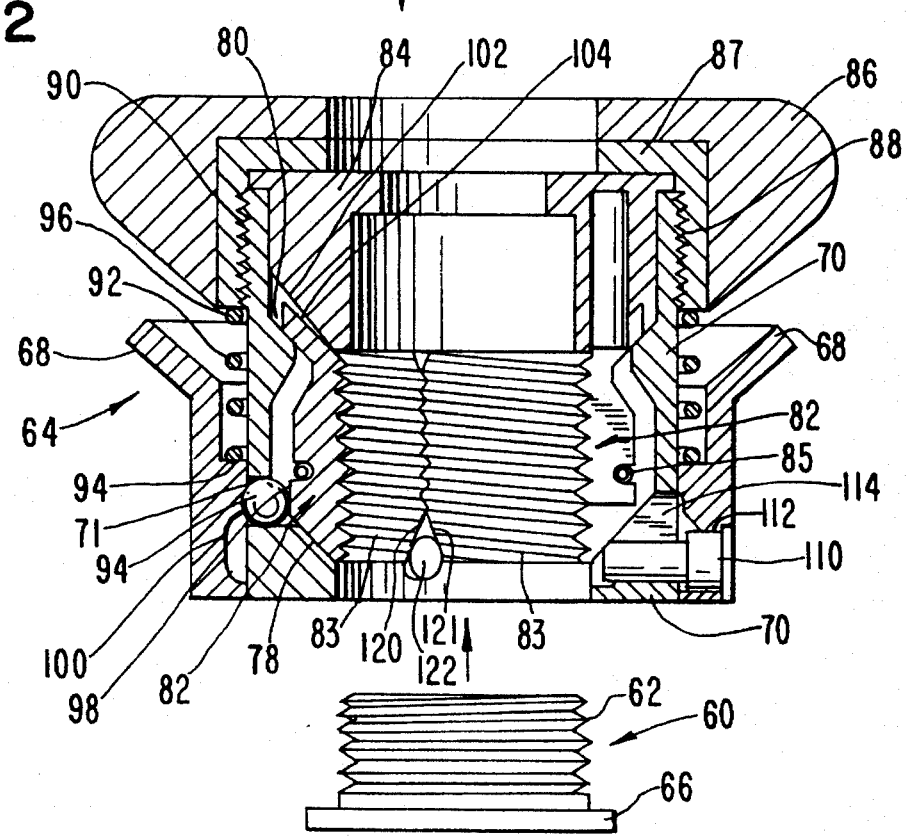
FIG. 2 is a sectional view of the coupling device of the present invention illustrating the position of the parts thereof when the first coupling member is not inserted within the second coupling member.
Figure 3:
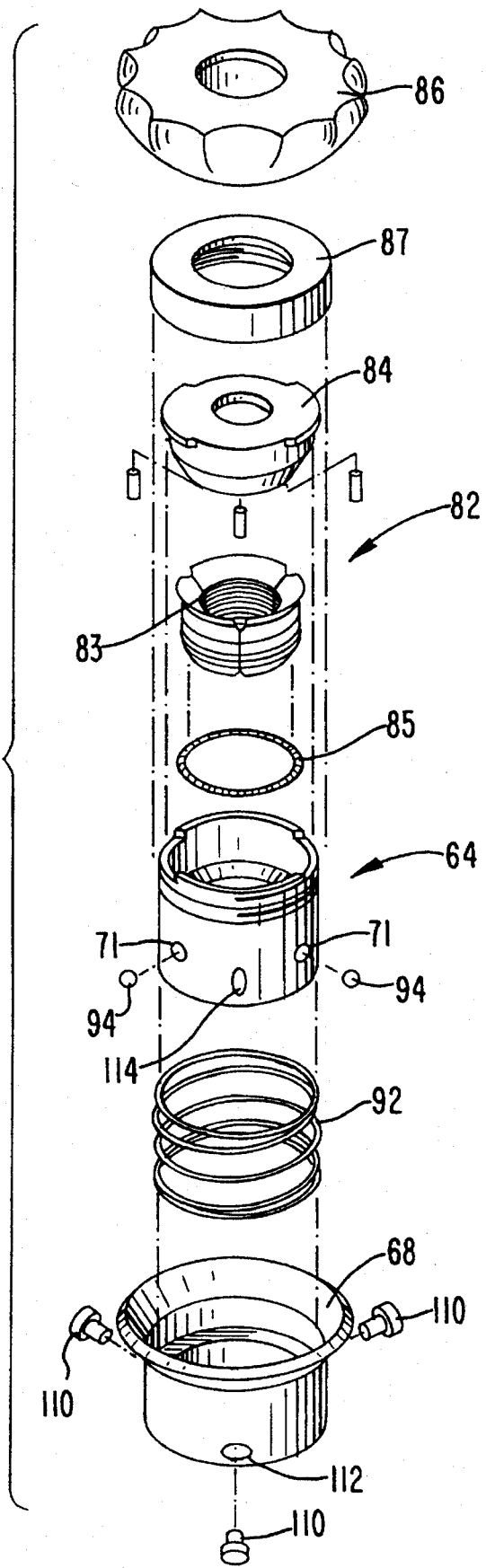
FIG. 3 is an exploded perspective view illustrating the parts of the second coupling member.
Figure 4:
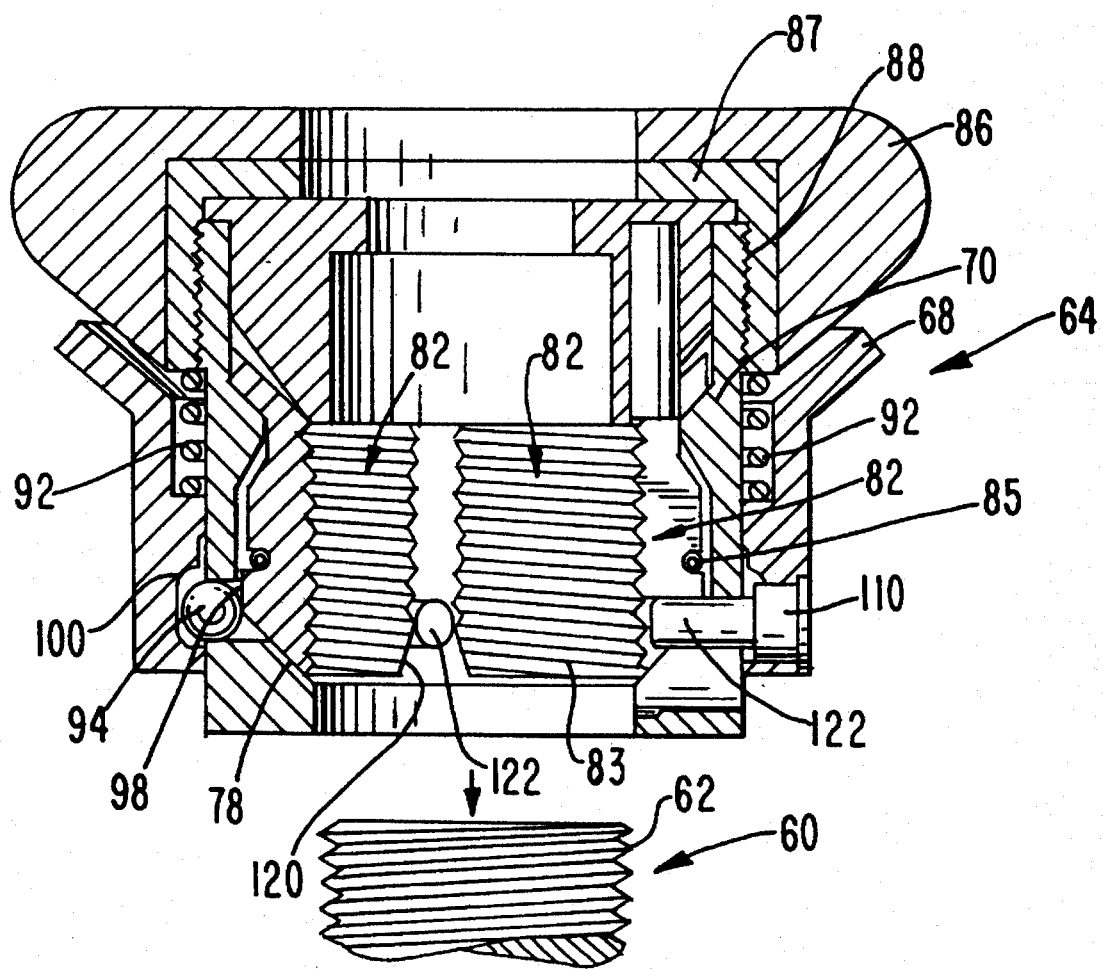
FIG. 4 is a sectional view of the coupling device of the present invention illustrating the movably mounted externally threaded elements in their outermost position permitting sliding movement of the first member in and out of the second member in an axial direction.

As seen in FIGS. 2–4, the coupling device of the preferred embodiment of the present invention includes a first member 60 provided with threads 62 and a second member generally designated by the reference numeral 64 having a threaded opening into which the first member 60 may be inserted and withdrawn. It will be apparent that the first member 60 is a bolt provided with a head 66 with helical threads 62 on the shaft thereof.

The second member 64 includes a sleeve 68 slidably mounted over a cylinder 70. The cylinder 70 is provided with a series of openings 71 within which balls 94 are mounted and elongated openings within which the pin assemblies 110 are mounted, as explained hereinafter.

The cylinder 70 is provided with a frustoconical surface 78 which is a surface of revolution extending at an acute angle to the longitudinal axis of the sleeve 68 and cylinder 70 along which the first member 60 moves. A second frustoconical surface 80 is provided within the cylinder 70 extending at an acute angle to the longitudinal axis of the sleeve 68 and the cylinder 70.

A plurality of movably mounted, externally threaded elements generally designed by the reference numeral 82 are positioned within the lower portion of the cylinder 70. The movably mounted threaded elements 82, which in the preferred embodiment are three in number, are held in place and urged downwardly within the cavity by the cap 84, as explained hereinafter, in conjunction with the garter spring 85 which urges the threaded elements inwardly. The movably mounted threaded elements 82 are provided with internal threads 83 coaxial with the cylinder 70.

The second member 64 includes a handle 86 which includes insert 87 which is provided with internal threads 88 which mate with the external threads 90 of the cap 84 permitting the handle 86 to be threaded on the cap 84.

A compression spring 92 has its lower end resting on shoulder 94 of sleeve 68 while the upper section 96 abuts against the lower edge of the handle 86. The compression spring 92 normally urges the handle 86 away from the sleeve 68.

The reference numeral 94 designates steel balls associated with each of the openings 71 and with the movably mounted externally threaded elements 82. It will be apparent that each of the balls 94 is positioned within one of the openings 71 within the cylinder 70. As seen in FIG. 2, one side of each of the balls 94 abuts the shoulder 98 of the corresponding movably mounted externally threaded element 82. There are provided on the inner surface of the sleeve 68 cavities 100 into which the balls 94 enter as the cylinder 70 moves downwardly relative to the sleeve 68.

The reference numeral 110 generally designated a group of pull pins which are mounted within elongated openings 114 within the sleeve 68 permitting the pull pins 110 which are fixedly secured to the sleeve 68 to move within the elongated openings 114 as the cylinder 70 moves relative to the sleeve 68.

The sides of each of the movably mounted externally threaded elements 82 include tapered portions 120 and 121 which form a "V" and surround the ends 122 of the pin assemblies 110. As can be seen in FIG. 2, when the movably mounted externally threaded elements 82 are in abutting relationship the end portions 122 of the pin assemblies 110 are positioned such that only slight engagement takes place with the tapered portions 120 and 121. However, as seen in FIG. 4, when the handle 86 is moved against the force of the compression spring 92 to move the cylinder 70 downwardly, the end portions 122 of the pin assemblies 110 press against the tapered portions 120 and 121 thereby forcing the externally threaded elements 82 outwardly in a radial direction. At this time that the balls 94 move into the cavities 100.

It will also be apparent from FIG. 4 that as the handle 86 is moved towards the sleeve 68, the mating relationships between the frustoconical surfaces 78, 80, 102 and 104, etc., together with the positioning of the balls 94, ensures proper alignment and positioning of the three movably mounted externally threaded elements 82. In this manner, improper jamming of the threads 62 of the first coupling member 60 with the threads 83 of the three movably mounted externally threaded elements 82 is avoided. When the handle 86 is moved towards the sleeve 68 causing the movably mounted externally threaded elements 82 to move outwardly, the first coupling member 60 is inserted by axial, sliding movement. As the handle 86 is released the movably mounted externally threaded elements 82 move together tightly gripping the threads 62 of the first coupling member 60, after which the first coupling member 60 may be rotated until the head 66 abuts the bottom surface of the second coupling member 64.

Disengagement is accomplished in the reverse manner. Initially, the user is required to release the first member 60 from contact with the second member 64 by rotating the first member. Thereafter, as the handle 86 is urged downwardly relative to the sleeve 68, resulting in the movably mounted externally threaded elements 82 moving outwardly, the first member 60 is withdrawn merely by pulling same outwardly along a rectilinear axis. From the foregoing it will be apparent that release of the first member 60 may be accomplished simply by rotating the second member very slightly, after which simple manual manipulation of the second member 64 withdraws the threaded elements 82 from engagement permitting the first member 60 to be slidably removed axially from the second member 64.

I claim:

1. A coupling device, comprising:

a first member provided with threads;

a second member having an opening into and out of which said first member may be inserted and removed, respectively;

threaded elements within said second member mounted for movement between a first position wherein the first member may be threaded within the second member and a second position where the threaded elements have a diameter larger than the diameter of the threads of the first member permitting the first member to slide axially in and out of the second member, as desired;

adjacent portions of the threaded elements being provided with sloping surfaces, and pin assemblies associated with the threaded elements and positioned between the sloping surfaces; and manually operable mechanism for moving the pin assemblies longitudinally wedging the pin assemblies against the sloping surfaces of the threaded elements expanding the threaded elements to their second position aforesaid.

2. A coupling device as in claim 1, further comprising balls associated with the threaded elements positioned within openings within the second member, the balls being moved by the second member when the threaded elements assume their second position into a locking relationship.

3. A coupling device as in claim 1, wherein said second member includes a sleeve and a cylinder mounted for relative movement, the cylinder provided with elongated openings, the pin assemblies passing through the sleeve and the elongated openings of the cylinder, the width spanned by the sloping surfaces approximating the diameter of the pin assemblies when the threaded elements are in the first position.

4. A coupling device as in claim 3, further comprising balls associated with the threaded elements, openings associated with the balls located within the cylinder, and a cavity formed in the cylinder associated with each of the balls for encompassing a portion of the balls when the threaded elements are in the second position.

5. A coupling device, comprising:

a first member provided with threads;

a second member having an opening into and out of which said first member may be inserted and removed, respectively;

threaded elements within said second member mounted for movement between a first position wherein the first member may be threaded within the second member and a second position where the threaded elements have a diameter larger than the diameter of the threads of the first member permitting the first member to slide axially in and out of the second member, as desired; and balls associated with the threaded elements positioned within openings within the second member, the balls being moved by the second member when the threaded elements assume their second position.

6. A coupling device as in claim 5, further comprising:

adjacent portions of the threaded elements being provided with sloping surfaces, and pin assemblies associated with the threaded elements and positioned between the sloping surfaces, and a manually operable mechanism for moving the pin assemblies longitudinally wedging the pin assemblies against the sloping surfaces of the threaded elements expanding the threaded elements to their second position aforesaid.

* * * * *